United States Patent [19]

Horie et al.

[11] Patent Number: 4,635,145
[45] Date of Patent: Jan. 6, 1987

[54] FLOPPY DISK DRIVE WITH STAND-BY MODE

[75] Inventors: Nobuyuki Horie, Yamatokoriyama; Noriaki Sakamoto, Nara; Toshiaki Fujikawa; Toshihiro Yamanaka, both of Ikoma, all of Japan

[73] Assignee: Sharp Kabushiki Kaisha, Osaka, Japan

[21] Appl. No.: 703,901

[22] Filed: Feb. 21, 1985

[30] Foreign Application Priority Data

Feb. 22, 1984 [JP] Japan .................................. 59-34556

[51] Int. Cl.$^4$ ...................... G11B 19/00; G11B 21/08
[52] U.S. Cl. ........................................ 360/78; 360/69; 360/75
[58] Field of Search ................ 360/69, 137, 78, 74.1, 360/71, 73, 60, 75, 106; 371/66

[56] References Cited

U.S. PATENT DOCUMENTS 3,956,740  5/1976  Jones et al. .................... 360/137 X
4,519,011  5/1985  Bowden ............................ 360/137

FOREIGN PATENT DOCUMENTS 0133233   2/1985  European Pat. Off. ............. 360/69
52-40111  3/1977  Japan ................................. 360/78
58-188378 11/1983 Japan ............................. 360/74.1
58-211359 12/1983 Japan ............................. 360/137

OTHER PUBLICATIONS

IBM TDB, vol. 19, No. 4, "Head-to-Track Synchronizing Mechanism for Magnetic Disks", Porter et al., 9/76, pp. 1393-1395.

Primary Examiner—Aristotelis M. Psitos
Assistant Examiner—Steven R. Garland
Attorney, Agent, or Firm—Birch, Stewart, Kolasch & Birch

[57] ABSTRACT

A floppy disk drive system with a stand-by mode that shuts off power to the drive circuits that drive the head-positioning motor and the disk drive motor. The stand-by model is activated when no motor-activating signal is input within a predetermined period of time. As a result, this unique stand-by mode significantly reduces the power consumption of the floppy disk drive unit. At the same time, the stand-by mode extends the service life of several important components, such as the head-positioning pulse motor. When the stand-by mode is entered from the normal mode, the current position of the head is stored. Then when the normal mode is to be reentered from the stand-by mode, the head is first moved to a reference track and then back to the position at which the stand-by mode was entered so that the value of the two counters is equal.

4 Claims, 18 Drawing Figures

FLOPPY DISK DRIVE WITH STAND-BY MODE

BACKGROUND OF THE INVENTION

The present invention provides an improved system for efficiently controlling the floppy disk drive unit. In particular, the system minimizes power consumption when the floppy disk drive unit halts its read-and-write operations.

All conventional floppy disk drive units are provided with mechanical units such as a disk driver and head positioner. The disk driver causes the disk to rotate at a constant speed by means of the spindle motor. The drive circuit constantly receives power even when it remains inoperative. The head positioner is provided with a pulse motor, for example, which causes the read-write head to shift itself it a specific track position, while the excited coil also constantly receives power so that the head position does not deviate after the head has been moved. Thus, since the floppy disk drive unit still employs conventional means of supplying power, a substantial amount of power is constantly supplied to the excited coil of the pulse motor even when the floppy disk drive unit remains inoperative and executes no read-and-write operations. As a result, power dissipation is a problem. Although conventional floppy disk drive units stop the spindle motor and the read-write circuit to save power and protect the head from wear while no read-and-write operations are performed, the drive unit still feeds power to the pulse motor to stabilize the position of the head.

OBJECT AND SUMMARY OF THE INVENTION

In light of the disadvantages described above, the present invention provides a useful system for effectively controlling the floppy disk drive unit so that power consumption can be minimized. To achieve this, the preferred embodiment provides means for activating the stand-by mode to shut off the power from the drive circuit of the floppy disk drive motor, thus allowing the stand-by mode to be entered when no signal activating the drive motor is delivered within a predetermined period of time. This system shuts off the power to the head-positioning motor and the drive circuit of the floppy disk drive motor while no read-and-write operations are executed by the floppy disk drive unit, thus minimizing power consumption. In addition, the preferred embodiment provides means to activate the power-saving stand-by mode, i.e., when neither reading nor writing operations are executed by the floppy disk drive unit, power is shut off to the spindle motor, the excited coil of the pulse motor, the read-write circuit, and a variety of sensors. This also causes the control CPU to stop its own system clock operation in the floppy disk drive unit, thus sharply minimizing power consumption. This system is further provided with means to prevent the read-write head from deviating in position which might otherwise occur when power is shut off to the excited coil of the pulse motor. This also allows the floppy disk drive unit to return to the operative mode from the stand-by mode in response to the motor-activating signal.

A BRIEF DESCRIPTION OF THE DRAWINGS

Figure 7:
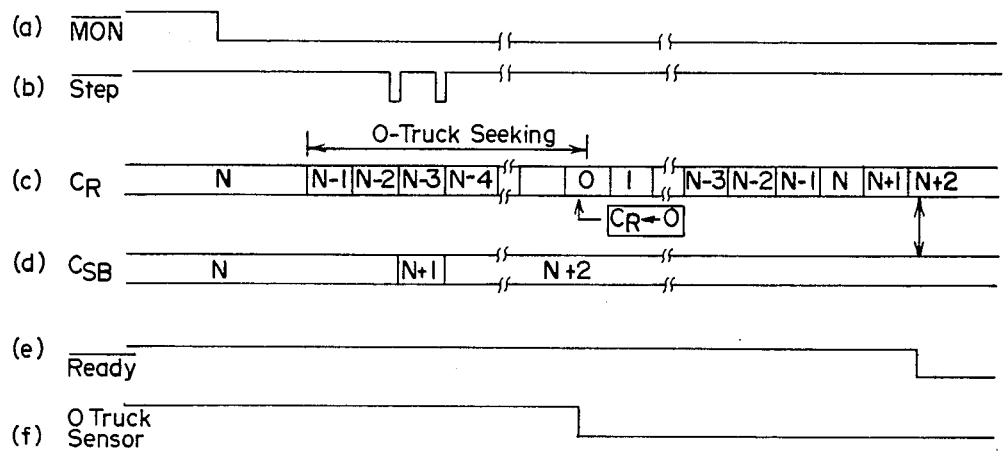
Figure 8:
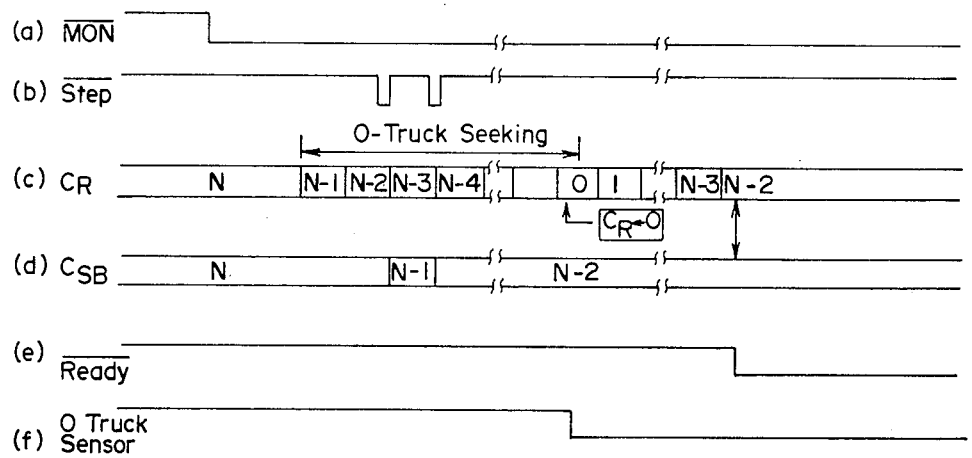

FIGS. 7 and 8 each consisting of respective parts (a)–(f), illustrate the operations needed to execute the O-track seeking operation.

DETAILED DESCRIPTION OF THE INVENTION

Referring now to the attached drawings, one of the preferred embodiments of the present invention is described below.

Figure 1:
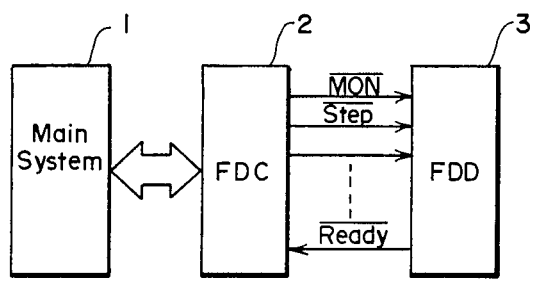
FIG. 1 is a simplified block diagram of the floppy disk drive unit incorporating the preferred embodiment of the present invention.

FIG. 1 is a simplified block diagram of the floppy disk drive unit incorporating the preferred embodiments of the present invention. In FIG. 1, reference number 1 indicates the main system, 2 indicates the floppy disk controller, and 3 indicates the floppy disk drive unit.

The floppy disk drive unit (3) has a configuration in which the ON/OFF operation of the spindle motor and the shift of the head position are controlled by a variety of control signals. Reference code $\overline{\text{MON}}$ in FIG. 1 indicates the motor-activating signal controlling the operation of the spindle motor. When this signal goes low, the spindle motor starts to rotate. Reference code $\overline{\text{STEP}}$ indicates the step pulse signal, in which one pulse deals with the shifting operation of one track. Conventionally, before activating either reading or writing operations, the floppy disk controller (2) delivers the low-level motor-activating signal $\overline{\text{MON}}$ to the floppy disk drive unit (3) to rotate the spindle motor. The floppy disk controller (2) also outputs a $\overline{\text{STEP}}$ step pulse so that the read-write head can be transferred to the designated track. The read-write head executes either reading or writing operations after the spindle motor has started to run at a constant speed and the controller (2) has received a $\overline{\text{READY}}$ signal from the floppy disk drive unit (3). When reading or writing is completed, the floppy disk controller (2) outputs the high-level $\overline{\text{MON}}$ signal to stop the spindle motor. The preferred embodiment provides the floppy disk drive unit (2) with the power-saving stand-by mode for identifying its own status. It works as follows: When neither reading nor writing is executed, the stand-by mode is entered so that the power is shut off to all inoperative circuits. The stand-by mode is entered when no motor-activating signal $\overline{\text{MON}}$ from the floppy disk controller (2) has been input for a specific period of time. The preferred embodiment allows the specific period of time to be selected from a variety of settings. The normal mode can be restored from the stand-by mode only when the motor-activating signal $\overline{\text{MON}}$ has been delivered from the floppy disk controller. In reference to the attached drawings, the preferred embodiments are described below.

As described earlier, FIG. 1 shows the relationship between the floppy disk controller (2) and the floppy disk drive unit, the entire operation of the floppy disk drive unit (3) being subject to the control of the floppy disk controller (2) by means of the various control signals it delivers.

Figure 2:
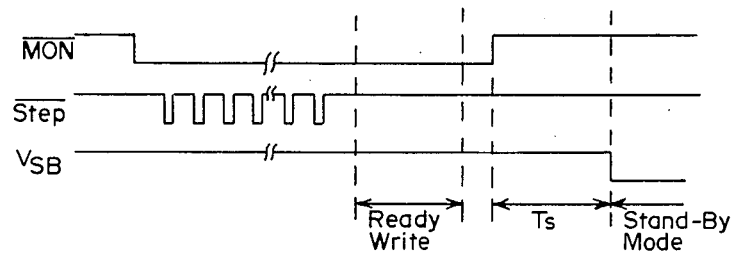
FIG. 2 is a timing chart indicating the timing at which the stand-by mode is activated.

FIG. 2 shows the timing at which the stand-by mode is entered from the normal mode. Reference code VSB indicates the power source. The VSB power source is supplied to the excited coil of the pulse motor, the drive circuit of the spindle motor, the index sensor which detects the index pulse, the O-track sensor that detects whether the read-write head is in the O-track position, and the read-write circuit that amplifies the read signal from the head and generates the write current (voltage) waveforms needed to write all data onto a disk.

Reference code Ts indicates the waiting time until the stand-by mode is entered. It begins when the motor-activating signal $\overline{MON}$ goes High. The waiting time Ts can be selected from a variety of settings so that the operator can effectively use the stand-by mode. After passing the specific Ts period of time (from the moment at which the motor-activating signal $\overline{MON}$ went high to the moment when either the reading or writing operation is implemented), if the motor activating signal $\overline{MON}$ still remains high, the normal mode shifts into the stand-by mode, causing the VSB power source to enter a low-level so that no power is supplied to those circuits which should not be operated during this period. Simultaneously, the system clock of the CPU used to control the floppy disk drive unit (3) also stops its counting operation. The system clock resumes operation simultaneously as the normal mode is restored from the stand-by mode.

Figure 3:
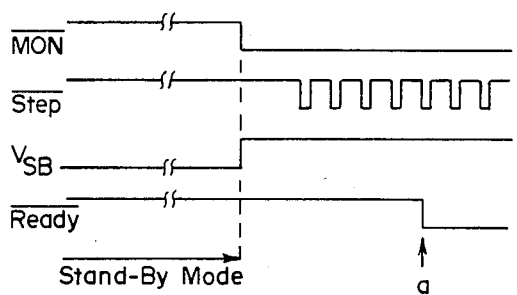
FIG. 3 is also a timing chart indicating the timing at which the drive unit is released from the stand-by mode.

FIG. 3 shows the timing at which the normal mode is restored from the stand-by mode. As is clear from FIG. 3, as soon as the $\overline{MON}$ motor-activating signal goes low to activate the spindle motor, the VSB power source rises to instantly resume the supply of power and the controller CPU also resumes its system clock operation. The CPU controlling the floppy disk drive unit (3) stops its system clock operation by software and resumes operation of the system clock using the external interrupt signal. The falling point "a" of the $\overline{READY}$ signal shown in FIG. 3 is determined by the moment when the spindle motor achieves a constant rotation speed.

Figure 4:
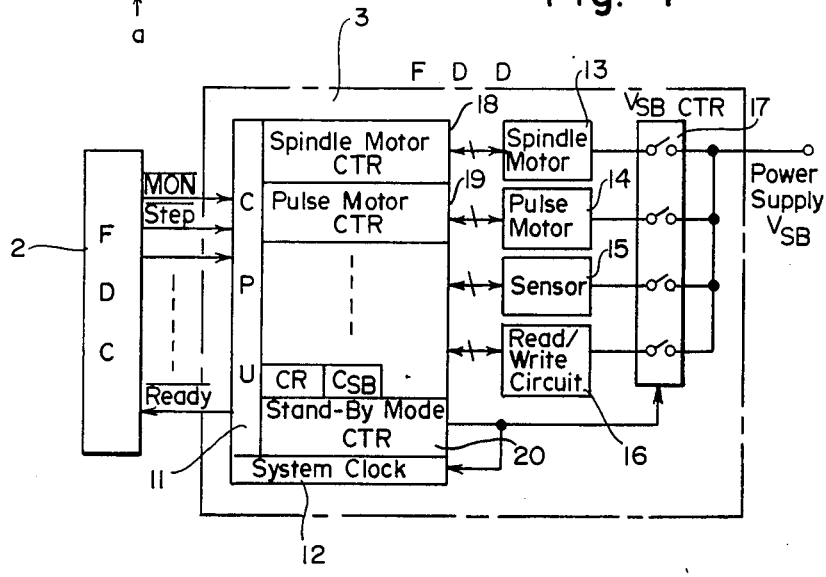
FIG. 4 is a schematic diagram of the floppy disk drive unit incorporating the preferred embodiment of the present invention.
Figure 5:
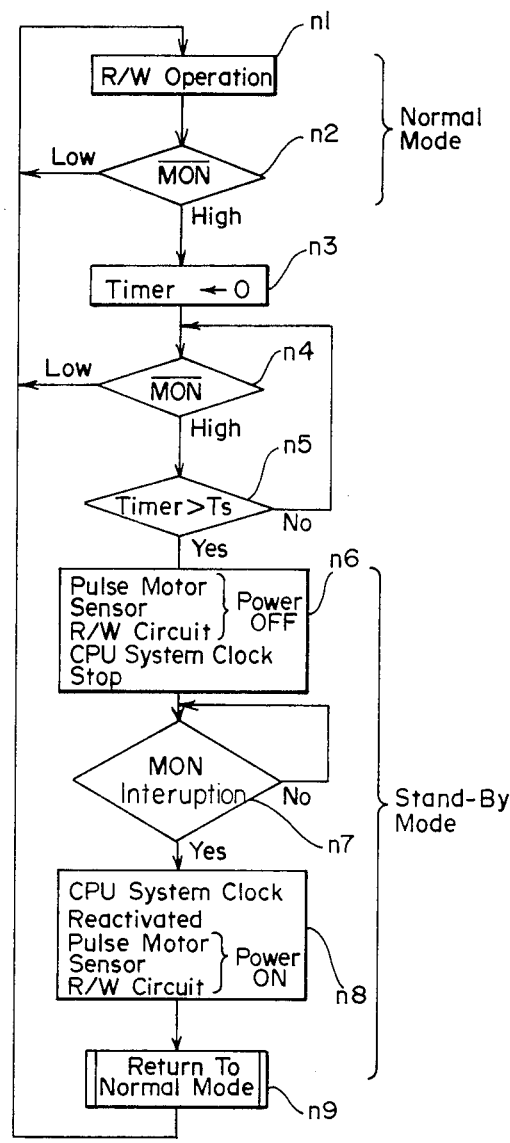
FIG. 5 is a flowchart describing sequential operations executed after activating the stand-by mode.

FIG. 4 shows the schematic block diagram of the floppy disk drive unit (3) provided with the stand-by function described above. As shown in FIG. 4, the floppy disk drive unit (3) is provided with a controller CPU (11), a system clock generator (12) for the CPU, a spindle motor (13), a pulse motor (14), sensors (15), a read-write circuit (16), a VSB controller (17) which controls the supply of the VSB power source, a spindle motor controller (18), a pulse motor controller (19), and a stand-by mode controller (20). Control means 18 through 20 are controlled by programs. FIG. 5 shows a flowchart describing the sequential program operations needed to control the stand-by mode relevant to the preferred embodiment of the present invention. The floppy disk drive unit (3) receives the $\overline{MON}$ motor-activating signal and the $\overline{STEP}$ step pulse signal from the floppy disk controller (2) and conversely delivers a $\overline{READY}$ signal to FDC 2. Actually, switching of the VSB power source in the VSB power source controller (17) is executed by a number of electronic switching elements. By using the constituents described above while the read-and-write operations continue, the $\overline{MON}$ motor-activating signal remains low, whereas the system remains in the normal mode, thus repeating steps n1 and n2 in FIG. 5. When the CPU determines that the $\overline{MON}$ motor-activating signal is high during step n2, operation proceeds to step n3 to reset the RAM-area timer that counts the real-time clock when this clock starts the counting operation. The CPU then determines whether the counted content has exceeded the predetermined waiting time Ts until the moment the stand-by mode begins while the $\overline{MON}$ motor-activating signal is still high (steps n4 and n5). When the timer-counted content is greater than the predetermined waiting time Ts, the stand-by mode is entered, causing operation to enter step n6. As a result, the CPU causes the power-off control signal to be delivered to the VSB controller (17) so that no power is supplied to the pulse motor (14), sensors (15), and read-write circuit (16). Simultaneously, the power-off control signal also causes the CPU system clock generator (12) to discontinue CPU system clock counting. As a result, the floppy disk drive unit (3) which has entered the stand-by mode then proceeds to step n7 and the controller CPU then determines whether the $\overline{MON}$ motor-activating signal has already been delivered. The system remains in the stand-by mode until the $\overline{MON}$ motor-activating signal is delivered. If the $\overline{MON}$ motor-activating signal is detected during step n7, operation proceeds to step n8, thus reactivating CPU system clock operation. Simultaneously, the power supply to the pulse motor (14), sensors (15), and the read-write circuit is restored, thus resuming the normal mode (step n9). The waiting time Ts that leads up to the start of the stand-by mode is stored as plural values in the CPU 11, either of these values being optionally chosen by the operator, who can also provide the Ts value from an external source. Since the stand-by mode shuts off the power supply to the excited coil of the pulse motor, the position of the read-write head may be altered while in the stand-by mode. To prevent this, the preferred embodiment provides means of executing the O-track seek operation when the normal mode is restored from the stand-by mode. Normally, conventional floppy disk drive units stabilize the position of the read-write head by supplying current through the excited coil of the pulse motor.

Conversely, the preferred embodiment of the present invention shuts off power to the excited coil of the pulse motor when neither reading nor writing is executed. Consequently, the read-write head cannot be securely held in position. In other words, the track position may be altered before restoring the normal mode due to external shock applied while in the stand-by mode. If this occurs, since the position of the head memorized by the floppy disk controller (2) differs from the actual position of the head, the head may read data from the wrong track, or the head may eventually erase important data that should be stored. To prevent this, the preferred embodiment causes the read-write head to return to the O-track position once when the normal mode is restored from the stand-by mode and then causes the O-track sensor to identify the O-track. After completing O-track seek operation, the read-write head can be correctly led to the required track position so that even the slightest deviation of the head position mentioned above can be prevented. Referring now to the attached drawings, the operation of the system is described below.

In FIG. 1, when the floppy disk controller (2) receives a request from the main system (1) to perform either reading or writing, the floppy disk controller (2) then outputs an $\overline{MON}$ low-level motor activating signal to the floppy disk drive unit (3). The controller (2) then outputs the $\overline{STEP}$ step pulse signal so that the head can be transferred to the designated track. Reading or writing is executed only after the rotation of the spindle motor becomes constant and the $\overline{\text{READY}}$ signal is received from the floppy disk drive unit (3). While these serial operations are executed, the system executes the O-track seeking operation between the time the stand-by mode is entered and he normal mode is resumed. While these operations are executed, the floppy disk controller (2) is not aware that the floppy disk drive unit (3) is executing the O-track seeking operation. As a result, the controller (2) may output the $\overline{\text{STEP}}$ step pulse signal while the floppy disk drive unit (3) is still performing the O-track seeking operation. If this occurs, the $\overline{\text{STEP}}$ step pulse signal output during the O-track seeking is ignored, thus causing the main system to malfunction. To prevent this, the preferred embodiment of the present invention provides the floppy disk drive unit (3) with two built-in counters: a CR head positioning counter and a CSB stand-by mode counter (see FIG. 4).

Figure 6:
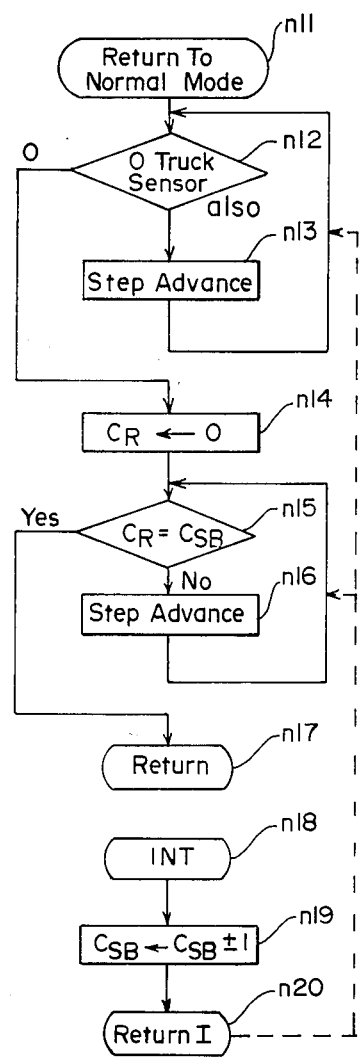
FIG. 6 is also a flowchart describing the sequential operations related to the O-track seek mode.

Referring now to the operation timing chart shown in FIG. 7, the above operations are described below. Assuming that the head position in the designated track is N immediately before the stand-by mode is entered, then the CR and CSB counters indicate N while in the stand-by mode as shown in FIG. 7(c) and (d). Using this state, the O-track seeking operation can be executed as soon as the $\overline{\text{MON}}$ motor-activating signal goes low and the normal mode is restored from the stand-by mode (see FIG. 6, step n11). The O-track seeking operation is executed as follows:

First, as shown in FIG. 6, steps are carried forward up to step n13 until the read-write head reaches the O-track position after the pulse motor (14) has received a pulse. The CR counter is reset when the O-track sensor has detected the O-track (step n14). Head step-advance operation is then performed by incrementing the contents of the CR counter until the contents of the CR and CSB counters match. This is done before the read-write head is transferred to the designated track (steps n15 through n17). After the head has been transferred to the designated track, if the rotation of the spindle motor (13) is constant, the floppy disk drive unit (3) delivers the $\overline{\text{READY}}$ signal to the floppy disk controller (2). When the floppy disk controller (2) outputs the $\overline{\text{STEP}}$ step pulse signal during the O-track seeking operation, the CPU 11 of the floppy disk drive unit (3) then moves to step n18 and executes an interruption using the received $\overline{\text{STEP}}$ step pulse signal. The CPU 11 then either adds or subtracts "1" from the content of the CSB counter, thus causing the content of the CSB counter to be renewed in response to the incoming $\overline{\text{STEP}}$ step pulse signal. Then, the O-track seeking operation is reactivated. FIG. 7 (d) shows a typical example, in which the $\overline{\text{STEP}}$ step pulse signal is renewed in a direction so as to diminish the contents of the CSB counter as soon as the normal mode is restored. The read-write head that once returned to the O-track no longer needs to proceed to truck N, but correctly stops at the position where the CR and CSB counters match, thus saving time. When restoring the normal mode from the stand-by mode, by executing the O-track seeking operation using these counters, the read-write head can be correctly transferred to the designated track. The unique stand-by mode embodied by the present invention makes it possible for the system to sharply reduce power consumption and, since the period of supplying power to these circuits and ambient mechanical components is very short, the service life of these important components can be extended. In addition, since the O-track seeking operation is executed while restoring the normal mode from the stand-by mode, incorrect tracking due to deviation in the head tracking position and reading of improper data can be prevented. In addition, the provision of two counters in the floppy disk drive unit (3) effectively prevents drop-off of step pulses that may occur during the O-track seeking operation when restoring the normal mode from the stand-by condition. These serial operations do not adversely affect normal operation of the floppy disk controller (2). The preferred embodiment thus far described can be easily and effectively executed without applying any particular software.

What is claimed is:

1. A floppy disk drive control system comprising:
   a floppy disk having a plurality of tracks;
   floppy disk drive-means for accessing data on said floppy disk;
   a floppy disk controller for providing control signals to said drive-means to control the operation thereof;
   said drive-means including,
      a read-write head for performing data reading and writing operations on a designated track of said floppy disk,
      a spindle motor for rotating said disk to enable said head to perform said reading and writing operations,
      a head-positioning motor for positioning said head over a designated track of said disk,
      a CPU responsive to said control signals from said controller for placing said drive-means in a normal mode for performing said reading and writing operations, or in a stand-by mode when no reading or writing operations are to be performed,
   wherein said CPU includes first means for storing the instantaneous track position of said head during the normal mode, and second means for storing the track position of said head at the time of transition from the normal mode to the stand-by mode,
   such that after said CPU receives a normal mode control signal from said controller while said drive-means is in the stand-by mode, said read-write head is transferred to a reference track of said disk to reset said first means, and is advanced over said tracks in a stepwise manner until the track positions stored in said first and second means are equal, thus enabling total power shut-off in the stand-by mode.

2. A floppy disk drive control system as claimed in claim 1, wherein said drive-means enters said stand-by mode a predetermined time after said CPU receives a stand-by mode control signal from said controller.

3. A floppy disk drive control system as claimed in claim 2, wherein said predetermined time is variable over a plurality of values.

4. A floppy disk drive control system as claimed in claim 1, further including interrupt means for enabling the track position stored in said second means to be incremented or decremented before the position stored in said first means becomes equal thereto.

* * * * *